United States Patent
Al-Nakhli et al.

(10) Patent No.: US 11,454,098 B2
(45) Date of Patent: Sep. 27, 2022

(54) METHODS FOR WELLBORE FORMATION USING THERMOCHEMICALS

(71) Applicants: SAUDI ARABIAN OIL COMPANY, Dhahran (SA); KING FAHD UNIVERSITY OF PETROLEUM & MINERALS, Dhahran (SA)

(72) Inventors: Ayman R. Al-Nakhli, Dhahran (SA); Mohammed A. Bataweel, Dhahran (SA); Mohamed Ahmed Nasr El Din Mahmoud, Dhahran (SA); Abdulazeez Abdulraheem, Dhahran (SA); Zeeshan Tariq, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 16/879,125

(22) Filed: May 20, 2020

(65) Prior Publication Data
US 2021/0363866 A1    Nov. 25, 2021

(51) Int. Cl.
*E21B 43/24* (2006.01)
*E21B 43/267* (2006.01)
*C09K 8/66* (2006.01)

(52) U.S. Cl.
CPC .......... *E21B 43/2405* (2013.01); *C09K 8/665* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 4,846,277 A | 7/1989 | Khalil et al. | |
| 2013/0126169 A1 | 5/2013 | Al-Nakhli et al. | |
| 2013/0206400 A1 | 8/2013 | Alexandrov et al. | |
| 2013/0206413 A1 | 8/2013 | Alexandrov et al. | |
| 2014/0374108 A1 | 12/2014 | Vandeponseele et al. | |
| 2015/0300142 A1* | 10/2015 | Al-Nakhli ............... | C09K 8/52 166/280.1 |

(Continued)

FOREIGN PATENT DOCUMENTS

| | | |
|---|---|---|
| CN | 1403529 A | 3/2003 |
| RU | 1794181 C | 2/1993 |

(Continued)

OTHER PUBLICATIONS

International Search Report and Written Opinion issued in corresponding International Patent Application No. PCT/US2020/037499, dated Feb. 12, 2021 (13 pages).

(Continued)

*Primary Examiner* — Andrew Sue-Ako
(74) *Attorney, Agent, or Firm* — Osha Bergman Watanabe & Burton LLP (57) ABSTRACT

A method for stimulating a well includes mixing at least one thermochemical with fracturing fluid to create a fracturing fluid mixture, injecting the fracturing fluid mixture into the well, creating an exothermic reaction with the fracturing fluid mixture, generating a pressure pulse in the well from the exothermic reaction, and fracturing a formation around the well with pressure from the pressure pulse and a hydraulic pressure source.

16 Claims, 4 Drawing Sheets

(56) References Cited

U.S. PATENT DOCUMENTS

| | | |
|---|---|---|
| 2015/0300143 A1 | 10/2015 | Al-Nakhli et al. |
| 2016/0319182 A1* | 11/2016 | Al-Nakhli ............ E21B 43/2405 |
| 2017/0101577 A1 | 4/2017 | Al-Dahlan et al. |
| 2017/0130568 A1 | 5/2017 | Al-Nakhli |
| 2018/0298274 A1 | 10/2018 | Zhao |
| 2019/0153844 A1 | 5/2019 | Phatak et al. |
| 2019/0203573 A1 | 7/2019 | Al-Mulhem |

FOREIGN PATENT DOCUMENTS

| | | |
|---|---|---|
| RU | 2221141 C1 | 1/2004 |
| RU | 2224103 C1 | 2/2004 |
| RU | 2605852 C1 | 12/2016 |
| RU | 2637259 C2 | 12/2017 |
| RU | 2696714 C1 | 8/2019 |
| WO | 2018160156 A1 | 9/2018 |

OTHER PUBLICATIONS

Morita, Nobuo et al., "Stress State, Porosity, Permeability and Breakdown Pressure Around a Borehole During Fluid Injection", The 22nd Symposium on Rock Mechanics (USRMS), American Rock Mechanics Association, Jun. 29-Jul. 2, 1981, pp. 192-197 (6 pages).

Garagash, Dmitriy and Emmanuel Detournay, "Influence of pressurization rate on borehole breakdown pressure in impermeable rocks", Rock Mechanics, Aubertin, Hassani & Mrtn (eds), 1996, ISBN 90 5410 838 X, pp. 1075-1080 (6 pages).

Falser, Simon et al., "Reducing breakdown pressure and fracture tortuosity by in-plane perforations and cyclic pressure ramping", ARMA 16-191, American Rock Mechanics Association, Jun. 2016 (9 pages).

Fahrman, B.P. et al., "Visualizing Well System Breakdown: Experimental and Numerical Analyses", ARMA 17-867, American Rock Mechanics Association, Jun. 2017 (7 pages).

Gomaa, Ahmed M. et al., "New Insights into Hydraulic Fracturing of Shale Formations", IPTC 17594, International Petroleum Technology Conference, Jan. 2014 (17 pages).

Haimson, B.C. and X. Huang, "Hydraulic fracturing breakdown pressure and in situ stress at great depth", Rock at Great Depth, Maury & Fourmaintraux (eds), 1989, ISBN 90 6191 975 4, pp. 939-946 (8 pages).

Bybee, Karen, "Hydraulic Fracturing in the Ghawar Field Carbonate and Sandstone Reservoirs", Journal of Petroleum Technology, Society of Petroleum Engineers Inc., SPE-0303-0047-JPT, Mar. 2003, pp. 47-48 (2 pages).

Pearson, C. Mark and Eric W. Reinbold, "An Investigation Into The Use of High Pressure Nitrogen Breakdown Treatments Prior to Hydraulic Fracturing", SPE 35741, Society of Petroleum Engineers Inc., May 1996, pp. 713-718 (6 pages).

Qahtani, Adbullah M., "A New Technique and Field Application for Determining Reservoir Characteristics from Well Performance Data", SPE 68141, Society of Petroleum Engineers Inc., Mar. 2001 (9 pages).

Rahim, Zillur et al., "Hydraulic Fracturing Case Histories in the Carbonate and Sandstone Reservoirs of Khuff and Pre-Khuff Formations, Ghawar Field, Saudi Arabia", SPE 77677, Society of Petroleum Engineers Inc., Sep. 2002 (9 pages).

Boscan, Jorge et al., "Propellant Perforation Breakdown Technique: Eastern Venezuela Field Applications", SPE 84913, Society of Petroleum Engineers Inc., Oct. 2003 (15 pages).

Gomaa, Ahmed M. et al., "New Insights into Shale Fracturing Treatment Design", SPE 167754, Society of Petroleum Engineers, Feb. 2014 (15 pages).

Oparin, Maksim et al., "Impact of Local Stress Heterogeneity on Fracture Initiation in Unconventional Reservoirs: A Case Study from Saudi Arabia", SPE-181617-MS, Society of Petroleum Engineers, Sep. 2016 (18 pages).

Ibrahim, Ahmed Farid and Hisham Nasr-El-Din, "Evaluation of the Breakdown Pressure to Initiate Hydraulic Fractures of Tight Sandstone and Shale Formations", SPE-191245-MS, Society of Petroleum Engineers, Jun. 2018 (19 pages).

Al-Nakhli, Ayman R. et al., "Chemically-Induced Pressure Pulse to Increase Stimulated Reservoir Volume in Unconventional Reservoirs", URTeC: 1922369, Unconventional Resources Technology Conference, Aug. 2014 (19 pages).

* cited by examiner

METHODS FOR WELLBORE FORMATION USING THERMOCHEMICALS

BACKGROUND

Hydrocarbon production is an important and rapidly growing industry on an international scale. The growing demand on hydrocarbon production places an equally growing need to tap into unconventional reservoirs to increase the accessibility of hydrocarbon sources. Formation fracturing operations on these unconventional reservoirs carry additional considerations and challenges, particularly with the hydrocarbon recovery practices, commercial viability, and structural limitations of reservoir locations.

Unconventional reservoirs are any kind of reservoirs that need extraordinary recovery practices that are independent of the conventional operating techniques. These reservoirs may include heavy oil and tar sands, coal-bed methane, gas, oil shales, tight-gas sands, and gas-hydrate deposits. Hydrocarbon reserves trapped within these types of low permeability formations exhibit little to negligible production. Accessing these reserves require a large fracturing network with high fracture conductivity to maximize well performance when implementing existing conventional recovery methods. Recovery from these unconventional reservoirs requires assertive and expensive solutions, such as hydraulic fracturing stimulation methods.

Hydrocarbons stored in unconventional reservoirs typically need extensive fracturing treatments to produce commercially viable products. One common conventional recovery method for stimulating these low productivity reservoirs is by drilling a horizontal well and conducting multistage hydraulic fracturing to increase stimulated reservoir volume (SRV). SRV is a term used to quantify the stimulated area in an unconventional reservoir by the creation of multiple complex fracture networks. The combination of horizontal drilling and hydraulic fracturing has allowed access to previously inaccessible hydrocarbon sources.

In hydraulic fracturing a specialized fracturing fluid is injected into an isolated segment or interval of the wellbore as part of a stimulation operation that fractures or cracks the rock formation. These cracks are called hydraulic fractures. Breakdown pressure, also referred to as formation breakdown pressure or fracture initiation pressure, is the pressure required to induce and propagate a hydraulic fracture in the formation rock. The hydraulic fracture allows fluids to flow inside the formation.

Unfortunately, the method of increasing SRV via hydraulic fracturing is overall undesirable. A common challenge in the use of the hydraulic fracturing of unconventional reservoirs is formation breakdown failure. Formation breakdown failure occurs when breakdown pressure, i.e., the pressure required to initiate a fracture in a rock formation, exceeds the design pressure rating of standard pumping equipment and methods used to apply pressure from the wellhead. In other words, when the applied pressure at the wellhead, i.e., wellhead pressure, is unable to reach breakdown pressure, formation breakdown failure may occur. This may cause the failure of numerous hydraulic fracturing stages and may require additional costly operational steps to prevent complete formation breakdown and potential abandonment.

In some cases, potential sources of hydrocarbon are left untapped because it is not possible to achieve breakdown within the completion or wellhead pressure limit, and those zones are abandoned without fracturing. Operations are usually forced to either plug the reservoir or sidetrack the well to another reservoir. Another approach is to pursue underbalanced drilling, another costly method. In underbalanced drilling, the wellbore pressure is maintained below the reservoir pressure at all times, and the resulting inflow from the reservoir is carefully controlled during the entire drilling process.

The use of hydraulic fracturing also requires complex equipment and material, leading to an overall costly implementation and operation of this technique. Hydraulic fracturing also typically involves the injection of high viscosity fluids into the well, leading to an environmentally undesirable outcome. The use of fracturing fluid by itself could form a damaging material for the fracture due to the high capillary forces. Moreover, the primary recovery of the hydraulic fracturing method is low, less than 20%. The low recovery relative to the overall economic and environmental cost of hydraulic fracturing supports a long felt need to find an effective stimulation technique and advance this area of technology.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments in accordance with the present disclosure may include a method of reducing the required wellhead pressure to breakdown a formation and enable hydraulic fracturing of competent rocks, where the method includes initiating hydraulic fracturing, pumping a fracturing fluid under the pressure and rate sufficient for cracking the formation of the reservoir, creating at least one fracture, mixing thermochemicals with fracturing fluids and generating pressure, combining the pressure pulses from the thermochemical mixture with hydraulic pressure to break the formation and reduce required wellhead pressure, creating an improved fracture to wellbore connection, improving proppant placement, enhancing well productivity, enhancing the porosity and permeability of the formation, and enabling the optimization of the required pumping capacity for the job execution.

In another aspect, embodiments of the present disclosure are directed to a system for reducing the required wellhead pressure to breakdown formation comprising thermochemicals, a delivery system for said thermochemicals for introducing the thermochemicals into the reservoir, and a hydraulic pumping system.

Other aspects and advantages of this disclosure will be apparent from the following description made with reference to the accompanying drawings and the appended claims.

DETAILED DESCRIPTION

Generally, embodiments disclosed herein relate to methods of reducing the required wellhead pressure to breakdown a formation and enable fracturing of competent rocks, where the methods include sending a mixture of thermochemicals and fracturing fluid downhole to generate in-situ pressure in combination with applying pressure from an external pressure source, e.g. hydraulic fracturing pumps, to break the formation and reduce required wellhead pressure, thereby enabling fracturing and stimulating well stages that would otherwise be left untreated with the conventional methods in the field. As used herein, wellhead pressure refers to the applied pressure at the wellhead, and may include hydraulic pressure generated by hydraulic fracturing pumps in a fracturing operation.

The embodiments disclosed herein may be useful when applied to unconventional reservoirs. Unconventional reservoirs may be defined as those formations wherein hydrocarbon recovery is not economically possible without the implementation of specialized stimulation treatments such as matrix acidizing or fracturing. Unconventional reservoirs such as shale gas, tight sands, heavy oil, and tar sands are some examples of formations that need specialized stimulation for hydrocarbon production.

Examples of unconventional reservoirs can be found in the southern part of Saudi Arabia, known as Pre-khuff. The Pre-khuff reservoirs are generally over-pressured, deep, competent rocks with a high young modulus (previously measured at 6-10 mpsi) and high minimum stress that is close to overburden (previously measured at 0.8-1.1 psi/ft). These conditions make fracturing stimulation operations challenging because of the high breakdown pressures that approach the completion tubular pressure limits or wellhead pressure limitations. These types of conditions leave a small operational window to initiate and place hydraulic fractures.

Although the embodiments disclosed herein focus on accessing unconventional reservoirs, the following embodiments and disclosure can be applied to any formations that would be receptive to the methods and systems disclosed.

Hydraulic fracturing is a drilling method used to extract hydrocarbons, such as petroleum or natural gas, from deep in the Earth. It is commonly used in low-permeability rocks like tight sandstone, shale, and some coal beds. Hydraulic fracturing may increase hydrocarbon flow to a well from a hydrocarbon-bearing rock formation by sending fracturing fluids downhole to fracture and stimulate the well, thereby creating SVR and promoting increased hydrocarbon extraction.

However, there are operational and technical challenges to hydraulic fracturing of unconventional reservoirs using fracturing fluids alone. For example, hydraulic fracturing requires high pressure conditions to push out the large volumes of fracturing fluid and proppant that extend beyond the borehole into the fractures. Also, hydraulic fracturing may lead to damaging water-phase trapping within the rock matrix and leave polymer residue within the fractures.

Chemically induced pressure pulse stimulation techniques using thermochemicals may be used to create synthetic sweet spots (radial fractures) in unconventional tight reservoirs by generating heat and high pressure through exothermic reactions within the reservoir. Once thermochemicals are pumped into the wellbore, the system may reach a triggering temperature that starts an exothermic reaction. The triggering temperature may depend on the type of thermochemicals being used, and may be, for example, greater than 77° F. or greater than 150° F. The triggering temperature may also depend on the pH and pressure conditions present, as well as the temperature in the wellbore. Temperature, pH, and pressure conditions may be taken into account to prevent a premature reaction when implementing the pressure pulse technique. For example, the triggering temperature may be increased by increasing the pH using reagents, such as sodium hydroxide. The exothermic reaction releases kinetic and thermal energy to fracture the formation. This type of pulse fracturing via a thermochemical exothermic reaction may reduce the necessary wellhead pressure (the applied pressure at the wellhead) to breakdown a formation by creating microfractures that can initiate and propagate synthetic sweet spots within the reservoir and improve hydrocarbon production.

Although the use of thermochemical reactions to create pressure pulses alone may result in an increase in SRV, it falls short of reducing the required wellhead pressure necessary to reach economic viability of unconventional reservoirs.

According to embodiments disclosed herein, a thermo-hydraulic fracturing method may include mixing thermochemicals with fracturing fluids to generate in-situ pressure via resulting exothermic reaction(s). The in-situ pressure from the exothermic reaction may combine with hydraulic pressure to reduce the required formation breakdown pressure necessary to initiate and propagate fractures and increase SRV in the formation.

By mixing thermochemicals with fracturing fluids in a thermo-hydraulic fracturing method according to embodiments of the present disclosure, a better fracture to wellbore connection may be created, which may improve proppant placement and enhance well productivity.

Further, by using thermo-hydraulic fracturing methods of the present disclosure that incorporate thermochemicals with fracturing fluid to combine energy and pressure sources of hydraulic fracturing and pressure pulse fracturing to initiate at least one fracture, the required wellhead pressure may be reduced as compared to conventional methods described above. In other words, pressure produced by hydraulic fracturing combined with a pressure pulse produced by thermochemicals may reduce the required applied pressure at the wellhead while still enabling the fracturing of high strength rock formations.

Figure 1:
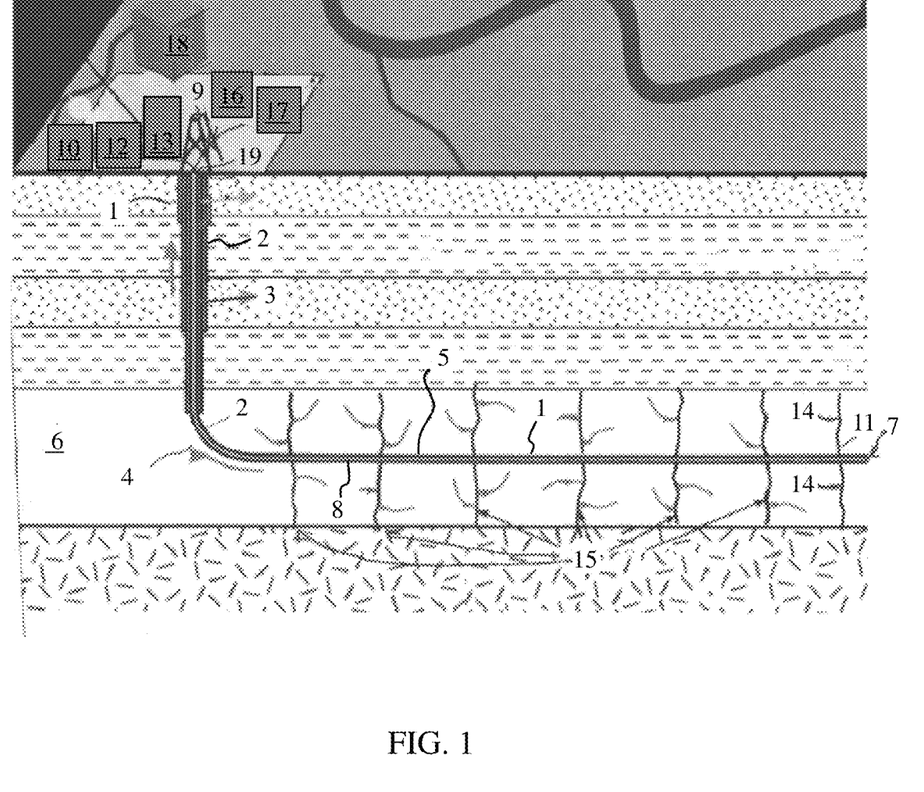
FIG. 1 shows a schematic of a system for a thermo-hydraulic fracturing operation according to embodiments of the present disclosure.

FIG. 1 is a schematic representation of a thermo-hydraulic fracturing operation. A wellbore 1 is created by drilling a vertical section 2 using drilling tools and drilling fluids. Once the vertical section 2 is created, it is stabilized with casing 3. Cement is pumped down the casing 3 to the end of the wellbore 1. When it reaches the bottom of the vertical section 2, it is pumped back up between the casing 3 and the borehole wall. The cement hardens and forms a cement shell that acts as a barrier between the wellbore 1 and the natural surroundings. The vertical section 2 extends to a depth called the kickoff point 4. The kickoff point 4 is where the wellbore 1 begins curving to create a horizontal section 5. The horizontal section 5 is drilled though the rock layer 6 containing the desired hydrocarbons. When the targeted distance 7 is reached in the horizontal section 5, the drill pipe (not shown) is removed and additional horizontal casing 8 is inserted and cemented into place in the horizontal section 5 of the wellbore 1. Once the drilling is finished, the drilling rig 9 is removed from the borehole 19 and well completion begins.

Well completion begins with a creation of a connection between the casing 8 and the reservoir rock layer 6 (e.g., perforating the casing). As an example, a tool (not shown) equipped with explosive charges may be lowered into the horizontal section 5. The explosives on the tool may be detonated, creating small holes through the horizontal casing 8, cement, and target rock layer 6. The tool may then be removed and the fracturing fluid stages begin.

First, a pad fluid may be pumped from a first pad fluid tank 10 into the wellbore 1 to initiate and propagate at least one fracture 11 from the small holes created from the previous fracturing stage. The pad fluid is pressurized, forcing it into the holes, further breaking down the formation 6 to create hydraulic fractures, as shown by fracture 11. The pressure required to induce a hydraulic fracture is called breakdown pressure, also referred to as formation breakdown pressure or fracture initiation pressure. Next, proppant fracturing fluid may be pumped from proppant fluid tank 12 into the wellbore 1. The proppant fracturing fluid used in the hydraulic fracturing process may consist of water, proppant, such as sand, and chemical additives. The proppant in the proppant fracturing fluid becomes trapped in the fractures 11 in the rock 6, enlarging the SRV. Once the pumping pressure is relieved, the proppant remains in the fracture 11 to maintain the SRV. This allows trapped oil or gas in the rock 6 to flow through the fractures of the SRV and into the wellbore 1. The final fracturing fluid used in the operation may be the overflush pad fluid. Overflush may be pumped into the wellbore 1 from the overflush tank 13. It is used to flush all fracturing fluids out of the reservoir.

According to embodiments of the present disclosure, thermochemicals from a thermochemical tank 18 may be mixed with one or more of the pad fluid, the proppant fracturing fluid, and the overflush fluid. Thermochemicals may be premixed with the fracturing fluid (pad fluid, proppant fracturing fluid, and/or overflush fluid) before sending downhole, or thermochemicals may be sent downhole concurrently with fracturing fluid (pad fluid, proppant fracturing fluid, and/or overflush fluid). In some embodiments, thermochemicals may be sent downhole in a thermo-hydraulic fracturing method prior to sending downhole a fracturing fluid (pad fluid, proppant fracturing fluid, and/or overflush fluid). In some embodiments, thermochemicals may be sent downhole prior to sending downhole a heated fracturing fluid (pad fluid, proppant fracturing fluid, and/or overflush fluid), where the heated fracturing fluid may be heated to a triggering temperature of the thermochemicals. In such embodiments, the heated fracturing fluid may trigger an exothermic reaction with the thermochemicals downhole in a target segment of the well.

Once an initial segment 14 of a fractured portion of the horizontal section 5 is complete, the initial segment 14 may be isolated via an isolation plug (not shown), and the tool with explosive charges may repeat the process above on subsequent segments 15 along the horizontal section 5. Once the desired amount of sections and fractures is reached, the isolation plugs between each section are drilled out and hydrocarbon production begins. The hydrocarbon flows up the wellbore 1 and may be collected in holding tank 16. The used fracturing fluid may also be collected and held in waste collection tank 17.

Thermo-hydraulic fracturing methods including incorporating thermochemicals with fracturing fluids combine both energies of hydraulic pressure and pulse pressure from exothermic reactions of thermochemicals to initiate a fracture, as discussed above. For conventional reservoirs, fracturing fluids may consist of linear and viscous gel for hydraulic fracturing treatment. Unconventional reservoirs may use slick water as the fracturing fluid. Slick water is fresh water with additives to aid in friction during pumping and completion. Additives of slick water may include bactericide, surfactant, clay stabilizer, friction reducer, and breaker, for example. Different types of fracturing fluids may be used depending on the reservoir and the drilling operation.

Examples of suitable types of fracturing fluids that may be used in thermo-hydraulic fracturing methods disclosed herein include, but are not limited to, mixtures having at least one of water, gels, foams, compressed gases, including nitrogen, carbon dioxide and air, liquefied petroleum gas, and/or propane. Fracturing fluids may include proppant, which may be a granular material such as silica sand, resin-coated sand, bauxite, and/or other ceramics. Further, fracturing fluids may include one or more additives, such as acids (e.g., hydrochloric acid, acetic acid, citric acid), sodium chloride and/or other salts (e.g., borate salts), polyacrylamide or other friction reducers, ethylene glycol, sodium carbonates, potassium carbonates, biocides, glutaraldehyde, guar gum and/or other gelling agents, and/or isopropanol. Fracturing fluids may be cellulose derivative linear gels (e.g., carboxymethyl cellulose, hydroxyethyl cellulose, carboxymethyl hydroxyethyl cellulose, hydroxypropyl cellulose, hydroxyethyl methyl cellulose), guar or its derivatives (hydroxypropyl guar, carboxymethyl hydroxypropyl guar), mixed with other chemicals, borate-cross-linked fluids (with guar-based fluids), organometallic-cross-linked fluids, and/or aluminium phosphate-ester oil gels. The types of fracturing fluids mentioned herein, as well as other types of fracturing fluids, may be used in combination with thermochemicals in thermo-hydraulic fracturing methods of the present disclosure.

As used herein, the term thermochemicals may include chemicals that exothermically react to produce heat and/or pressure, and thus, may also be referred to as thermochemical reactants. Thermochemicals may be provided in a fluid solution (e.g., a diluted or concentrated solution containing one or more types of thermochemicals) or in a dry form (e.g., a powder). In at least one embodiment of the present disclosure, thermochemical reactants may include urea, sodium hypochlorite, ammonium containing compounds, and/or nitrite containing compounds. Examples of the ammonium containing compounds include ammonium chloride, ammonium bromide, ammonium nitrate, ammonium sulfate, ammonium carbonate, and ammonium hydroxide. Examples of nitrite containing compounds include sodium nitrite and potassium nitrite.

In at least one embodiment of the present disclosure, thermochemical reactants may include both ammonium containing compounds and nitrite containing compounds to act as the thermochemical reactants. For example, the ammonium containing compound may be ammonium chloride, and the nitrite containing compound may be sodium nitrite. The thermochemical reaction of ammonium chloride and sodium nitrite is represented in the following chemical equation:

$$NH_4Cl + NaNO_2 \xrightarrow{(H^+ \text{ or } \Delta H)} N_{2(g)} + NaCl + 2H_2O + \text{Heat (75 Kcal/mol)}$$

Two types of energy, kinetic energy and thermal energy, are associated with the redox reactions of the thermochemical reactants in thermo-hydraulic fracturing methods. For example, in the redox reaction of the example embodiment provided above, when ammonium chloride and sodium nitrite solutions are mixed with the presence of an acid ($H^+$) or heat (e.g., $\geq 150°$ F.), $N_2$ gas pressure and heat will be generated. The ratio of the thermochemical reactants in a redox reaction may be 2:2 and 3:3, with a preferred ratio of 1:1. The concentration may vary from 0.5 to 9 Molar, with a preferred concentration of 3 Molar.

As discussed above, fracturing fluids are pumped into the wellbore during hydraulic fracturing at three stages; pad fluid stage, proppant fluid stage, and overflush stage. Pad fluid may initiate and propagate the fracture, proppant fluid may deposit proppant within the fracture to allow hydrocarbon to flow, and overflush fluid may flush out all proppant stage fluid from inside the fracture.

In one or more embodiments, a thermo-hydraulic fracturing method may include mixing thermochemicals with at least one of the pad fluid, proppant fluid, and overflush fluid. The mixture of thermochemicals and fracturing fluids may generate pressure pulses that can breakdown and propagate the formation fracture. Thermochemicals can be mixed with linear gel, crosslinked gel, or slick water in a well or pre-mixed before pumping into the wellbore. An example of concentration ranges of a fracturing fluid mixture (thermochemicals mixed with a fracturing fluid) is shown in the following table.

TABLE 1

| Additive | Concentration | Units |
| --- | --- | --- |
| Fresh water | Balance | gal/1000 gal |
| Bactericide | 0-5 | lb/1000 gal |
| Surfactant | 0-5 | gal/1000 gal |
| Clay stabilizer | 0-5 | gal/1000 gal |
| Friction reducer | 0-5 | gal/1000 gal |
| Breaker | 0-2 | lb/1000 gal |
| Sodium nitrite | 0.5-6 | Molar |
| Ammonium chloride | 0.5-6 | Molar |

The order and timing of the mixing process may vary. In one or more embodiments, the thermochemicals and fracturing fluid can be mixed together in one batch. The thermochemicals and fracturing fluid can also be premixed in at least two solutions. For example, one solution may consist of sodium nitrite and non-reactive additives, and the other solution may consist of ammonium chloride and non-reactive additives. The two solutions may then be mixed prior to pumping into the wellbore or may be mixed within the well. This approach may be helpful in situations that require a small amount of fracturing fluids.

In one or more embodiments, the fracturing fluid may be pre-mixed in a solution consisting of fresh water, bactericide, surfactant, clay stabilizer, friction reducer, breaker, but not including thermochemicals, such as sodium nitrite and ammonium chloride. The thermochemicals may be subsequently mixed into the solution prior to pumping or during the pumping process. The thermochemicals, as well as most of the additives, may also be mixed in the solution as dry powder, which may ensure that the thermochemical reaction occurs on site while allowing for ease of transportation of the components. Further, using a dry powder supply of one or more components for a fracturing fluid mixture (e.g., a dry powder thermochemical supply) may be helpful in situations that require a large volume of fracture fluids.

In one or more embodiments, organic or inorganic acid, such as acetic acid, may be added on site or to a mixture solution containing only ammonium chloride, but not sodium nitrite. The addition of an acid in this example may be effective in lower downhole temperature conditions, e.g., when the reservoir temperature is below 100° F. If an organic acid is used, then the organic acid concentration may vary from 1% to 20 vol %.

In one or more embodiments, a fracturing fluid mixture may avoid using slick water additives entirely and use only the thermochemicals on site via pumps or similar methods as one solution.

The choice of method for mixing thermochemicals depends on the volumes to be pumped in a given situation and conditions present, and the desired results. For example, if a large volume of a fracturing fluid mixture is to be pumped, e.g., into an unconventional well, then the chemical additives may be added on site.

In one or more embodiments of the present disclosure, the thermochemicals may be mixed in batch mixers. One or more batch mixers can be used on site for mixing the chemicals. For example, a batch mixer may be provided for each type of thermochemical reactant used in a fracturing fluid mixture (e.g., two batch mixers may be used to mix two thermochemical reactants into a fracturing fluid mixture, one for each thermochemical reactant). Total volume of fracturing fluid mixture, atmospheric pressure, and temperature may be considered when deciding on the best mixing method.

Figure 2:
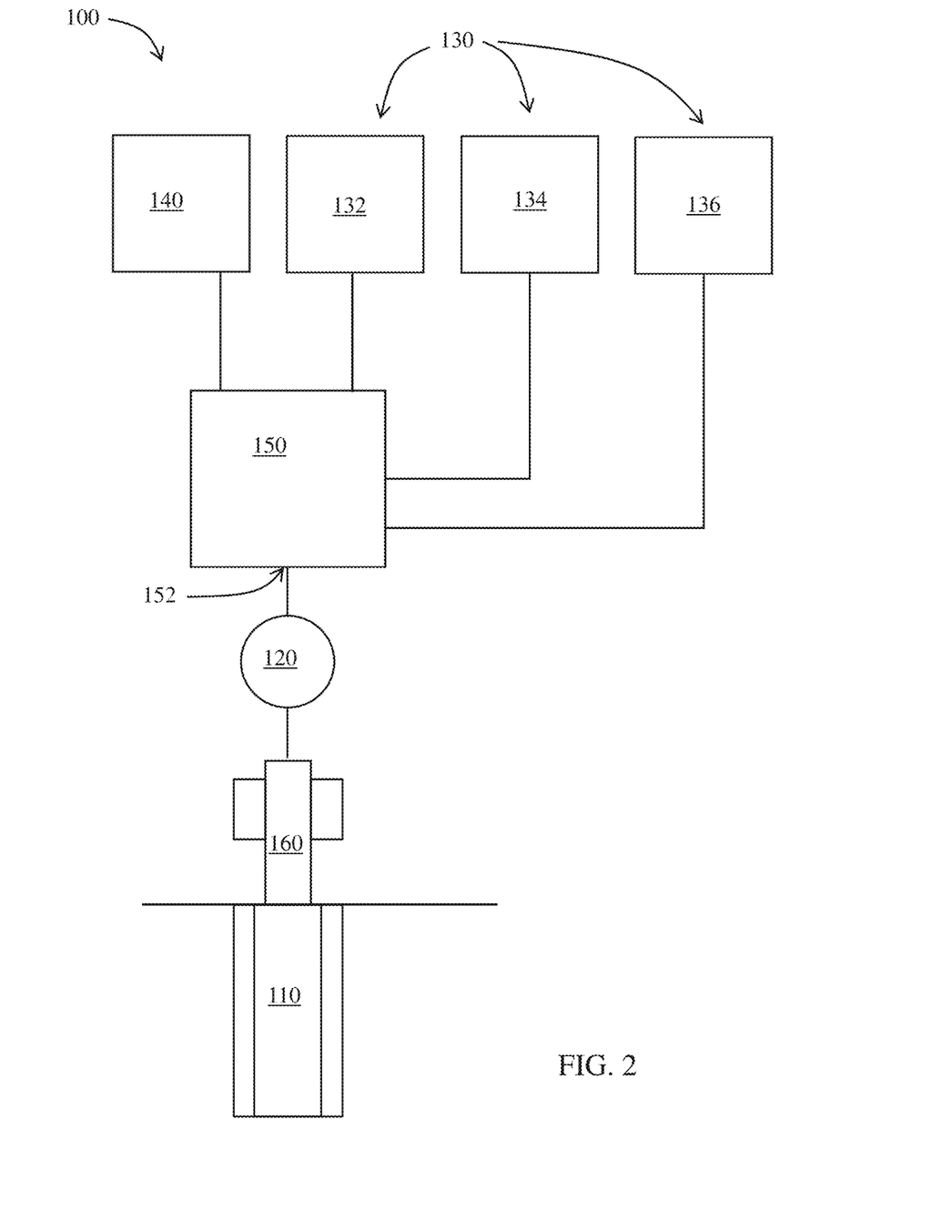
FIG. 2 shows a schematic of a system for providing a fracture fluid mixture to a well according to embodiments of the present disclosure.

FIG. 2 shows a schematic of an example system 100 for providing a fracturing fluid mixture downhole to fracture and stimulate a well 110. The system 100 may include at least one pump 120, a fracturing fluid 130, thermochemicals 140 (e.g., a thermochemical fluid or thermochemical dry powder), and at least one mixing assembly 150 in communication with the fracturing fluid 130 and with the thermochemicals 140. The mixing assembly 150 may include, for example, a housing that may act as a receiving container for receiving the fracturing fluid 130 and thermochemicals 140, one or more agitators (e.g., propeller(s) or auger(s)), and one or more outlets 152 which may be fluidly connected to a wellhead 160 of the well 110.

The fracturing fluid 130 may include a pad fluid 132, a proppant fluid 134, and an overflush fluid 136, each of which may be stored in a separate tank. The thermochemicals 140 may be provided from a single tank, or from multiple tanks (e.g., a separate tank for each thermochemical reactant being used). Each of the fracturing fluids 130 and thermochemicals 140 may be controllably metered into the mixing assembly 150, for example, using one or more valves and flow rate measuring devices (e.g., sensors).

The pump(s) 120 may be in communication with an outlet 152 of the mixing assembly 150 and may pump the fracturing fluid mixture from the mixing assembly 150 to the wellhead 160 of the well 110.

According to embodiments of the present disclosure, a method for stimulating a well 110 may include providing fracturing fluid 130 at a well site for the well 110, mixing thermochemicals 140 with the fracturing fluid to create a fracturing fluid mixture, heating the fracturing fluid mixture, and using the fracturing fluid mixture to increase pressure within at least one segment of the well 110. In some embodiments, the fracturing fluid mixture may be heated from a downhole environment in the well 110 to a triggering temperature, where the triggering temperature triggers an exothermic reaction with the fracturing fluid mixture.

In some embodiments, fracturing fluid and thermochemicals may be mixed into a fracturing fluid mixture by injecting the fracturing fluid and the thermochemicals into the well separately, wherein the thermochemicals are mixed with the fracturing fluid downhole in the well. In such embodiments, the fracturing fluid mixture may be heated from a downhole environment in the well to a triggering temperature, or the fracturing fluid may be heated prior to injecting the fracturing fluid downhole.

For example, a fracturing fluid (e.g., a pad fluid, a proppant fluid, and/or an overflush fluid) may be heated, and the heated fracturing fluid may be injected into the well after the thermochemicals are injected into the well. Fracturing fluid may be preheated, for example, to a temperature equal to or greater than a triggering temperature of the thermochemicals prior to injecting the heated fracturing fluid into the well. In some embodiments, fracturing fluid may be preheated prior to injecting into the well to a temperature greater than a downhole temperature in a segment of the well in which exothermic reactions are designed to take place. In embodiments where a preheated fracturing fluid is injected into a well after injecting thermochemicals into the well, the heated fracturing fluid may mix with the thermochemicals to form a fracturing fluid mixture and heat the thermochemicals to a triggering temperature, triggering the exothermic reaction with the thermochemicals.

According to some embodiments of the present disclosure, thermochemicals and fracturing fluid may be mixed to form a fracturing fluid mixture by concurrently injecting the fracturing fluid and the thermochemicals into the well.

Figure 3:
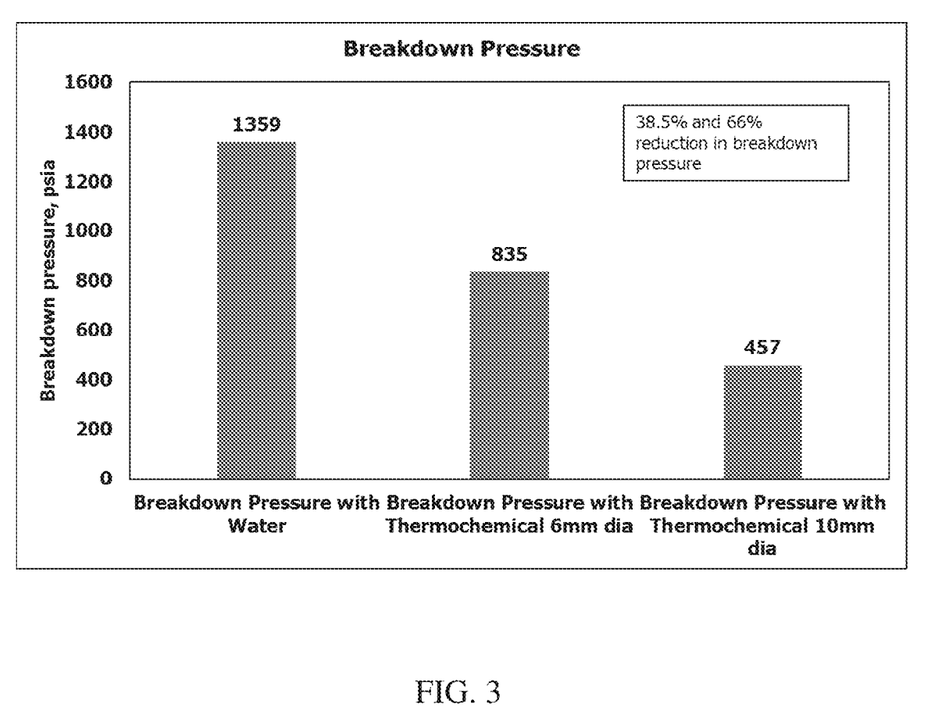
FIG. 3 shows a comparison for the breakdown pressure using fluids with and without thermochemicals.

As discussed above, embodiments disclosed in the present disclosure relate to thermochemicals mixed with fracturing fluid to generate pressure that combines with hydraulic pressure to break the formation and reduce required wellhead pressure. Laboratory experiments showed that wellhead pressure may be reduced by 60% when thermochemicals are combined with fracturing fluid in hydraulic fracturing. FIG. 3 shows a reduction in required wellhead pressure when using a combination of thermochemical reaction pressure and hydraulic pressure. As shown in FIG. 3, treatment with thermochemicals combined with fracturing fluid reduced the required wellhead pressure during hydraulic fracturing by 66%, compared with the required pressure when using water alone. This reduction in the pressure required to initiate formation breakdown enables the optimization of the required pumping capacity in hydrocarbon production execution.

Figure 4:
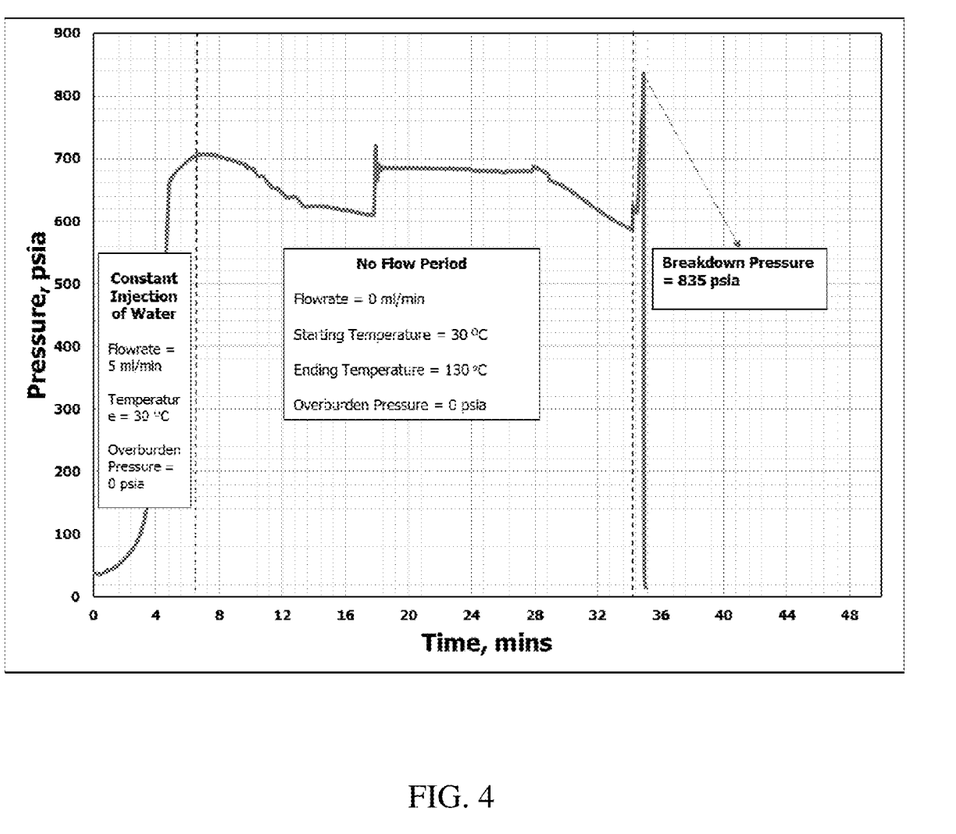
FIG. 4 shows results for a thermo-hydraulic fracturing test.

FIG. 4 shows test results of hydraulic fracturing of cement samples with thermochemicals. In this test, a sample was fractured with the combined pressure from hydraulic fracturing and the pressure from a thermochemical reaction. This test shows how the generated pressure pulse and pressure from the hydraulic pressure will fracture the rock, therefore reducing the required applied wellhead pressure.

As discussed above, formation breakdown failure is one of the major challenges that operators face when using conventional methods of hydrocarbon recovery of tight and high stress reservoirs. Lost potential sources of hydrocarbon are found throughout the industry due to high breakdown pressure that exceeds pumping limitation or completion rating. Advantageously, the current invention enables fracturing and stimulating well stages in reservoirs with excessive tectonic stresses that may be otherwise left untreated by reducing the required breakdown pressure. Overall pumping pressure may be reduced from 10 to 90%, thus allowing for the fracturing of these reservoirs.

Additionally, hydrocarbon reserves contained in unconventional reservoirs and similar low permeability formations exhibit little or no production and require a large fracture network with high fracture conductivity to maximize well performance. Therefore, these reserves remain economically undesirable to develop with existing production techniques, such as hydraulic fracturing or pressure pulse fracturing. In one or more embodiments of the present disclosure, the thermo-hydraulic fracturing method effectively contributes to fracture cleanup, creates an efficient SRV, and reduces overall costs for hydrocarbon production in unconventional reservoirs while maximizing hydrocarbon recovery.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A method for stimulating a well comprising:
providing a well system at the well to control fluid flow into the well, the well system comprising a hydraulic pressure source fluidly connected to a wellhead on the well;
mixing at least one thermochemical reactant with fracturing fluid to create a fracturing fluid mixture, wherein the at least one thermochemical reactant comprises one or more selected from the group consisting of urea, sodium hypochlorite, ammonium containing compounds, and nitrite containing compounds;
injecting the fracturing fluid mixture into the well using the hydraulic pressure source;
heating the fracturing fluid mixture to create an exothermic reaction with the fracturing fluid mixture;
generating a pressure pulse in the well from the exothermic reaction; and
using a combination of the pressure pulse and hydraulic pressure from the hydraulic pressure source to fracture a rock formation around the well at a wellhead pressure that is less than a design pressure limit of the hydraulic pressure source or the wellhead, wherein the wellhead pressure is applied pressure at the wellhead and the design pressure limit is lower than a breakdown pressure of the well.

2. The method of claim 1, wherein an additive in the fracturing fluid is at least one of slick water, bactericide, surfactant, clay stabilizer, a friction reducer, and a breaker.

3. The method of claim 1, wherein the thermochemical reactant is sodium nitrite.

4. The method of claim 1, wherein the thermochemical reactant is ammonium chloride.

5. The method of claim 1, wherein the fracturing fluid is selected from at least one of a pad fluid, a proppant fluid, and an overflush fluid.

6. The method of claim 1, wherein the hydraulic pressure source comprises a plurality of pumps pumping the fracturing fluid mixture into the wellbore.

7. The method of claim 1, wherein the at least one thermochemical reactant and fracturing fluid are mixed prior to bringing the fracturing fluid mixture to a well site.

8. The method of claim 1, wherein creating the exothermic reaction comprises heating the fracturing fluid mixture to a triggering temperature.

9. The method of claim 1, wherein the fracturing fluid mixture is heated from a downhole environment in the well to a triggering temperature.

10. The method of claim 1, wherein mixing comprises concurrently injecting the fracturing fluid and the at least one thermochemical reactant into the well.

11. A method for stimulating a well, comprising:
providing fracturing fluid and equipment for directing the fracturing fluid into the well at a well site for the well;
injecting at least one thermochemical reactant into the well, wherein the at least one thermochemical reactant comprises one or more selected from the group consisting of urea, sodium hypochlorite, ammonium containing compounds, and nitrite containing compounds;

heating the fracturing fluid;

injecting the heated fracturing fluid into the well using a hydraulic pressure source after the at least one thermochemical reactant is injected into the well;

using the heated fracturing fluid to trigger an exothermic reaction with the at least one thermochemical reactant downhole to generate a pressure pulse within at least one segment of the well; and using a combination of the pressure pulse and hydraulic pressure from the hydraulic pressure source to fracture a formation around the well at a wellhead pressure that is less than a design pressure limit of the equipment, wherein the wellhead pressure is applied pressure at a wellhead on the well and the design pressure limit is lower than a breakdown pressure of the well.

12. The method of claim 9, wherein the fracturing fluid is heated to a temperature above a triggering temperature of the at least one thermochemical reactant prior to injecting the heated fracturing fluid into the well.

13. The method of claim 9, wherein the fracturing fluid comprises at least one of a pad fluid, a proppant fluid, and an overflush fluid.

14. A system to fracture and stimulate a well, comprising:
at least one thermochemical reactant, wherein the at least one thermochemical reactant comprises one or more selected from the group consisting of urea, sodium hypochlorite, ammonium containing compounds, and nitrite containing compounds;

a fracturing fluid heated to a temperature equal to or greater than a triggering temperature of the at least one thermochemical reactant;

at least one pump in communication with the at least one thermochemical and the fracturing fluid; and a wellhead positioned at a surface of the well and in fluid communication with the at least one pump;

wherein the at least one pump or the wellhead have a design pressure limit lower than a breakdown pressure of the well, and wherein a combination of a pressure pulse from an exothermic reaction of the fracturing fluid and hydraulic pressure from the pump fractures a formation around the well at a wellhead pressure that is less than the design pressure limit.

15. The system of claim 14, wherein the fracturing fluid comprises at least one of a pad fluid, a proppant fluid, and an overflush fluid.

16. The system of claim 14, wherein the thermochemical reactant comprises at least one of ammonium chloride and sodium nitrite.

* * * * *